Jan. 6, 1970  E. C. DUERKSEN  3,487,774

TOY HAY BALER

Filed June 19, 1967

INVENTOR.
EDWARD C. DUERKSEN
BY
Richard D. Law
ATTORNEY

_United States Patent Office_  3,487,774
Patented Jan. 6, 1970

3,487,774
TOY HAY BALER
Edward C. Duerksen, 2465 S. Downing St.,
Denver, Colo. 80210
Filed June 19, 1967, Ser. No. 646,969
Int. Cl. B30b *1/04;* A63h *33/30*
U.S. Cl. 100—189    3 Claims

ABSTRACT OF THE DISCLOSURE

A toy hay baler has a packing cage with a removable door at one end and a packer connected on a bell crank which is operated by a hand manipulated crank. A top feeder, connected to the packer, bends sheaves of grass double and feeds them into the packing cage. The packer alternately packs the grass feed into the cage toward the backing door. Slots in the packing cage permit the packed "bales" of grass to be tied with a string, forming a toy hay bale.

---

Included among the objects and advantages of the invention is a toy hay baler having a feed arm and a packer arm connected in such a manner that a single, hand operated crank arm sequentially moves a feed arm in an operation of doubling sheaves of grass and feeding them into a packing cage and a packing arm to pack the doubled-over grass sheaves into the packing cage.

Another object of the invention is to provide a toy hay baler having means for tying string around a packed bale of grass or the like for forming toy hay bales thereof.

A still further object of the invention is to provide a toy hay baler which includes means for folding sheaves of grass into accordion folds in a packing cage and to pack such accordion folded grass into small toy bales of hay.

These and other objects and advantages of the invention may be readily ascertained by referring to the following description and appended drawings in which.

Figure 1:
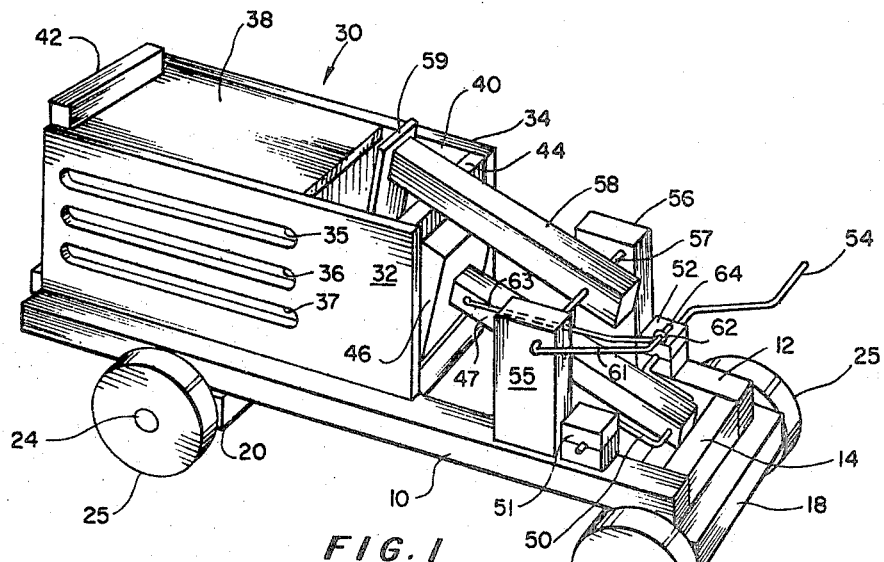
FIG. 1 is a perspective view of a toy hay baler according to the invention.

In the embodiment selected for illustration, a frame, which is a generally peripheral frame, has a packing cage mounted thereon. As illustrated, the frame includes longerons 10 and 12 running generally from front to rear with cross members 14 at the front end and 16 at the rear end thereof. A pair of axle support blocks 18 and 20 provide means for supporting front axle 22 and rear axle 24 for wheels 25. The axle supports and wheels are shown generally in block construction; it is recognized, however, that they may be generally of a convenient configuration which provides a wheeled frame. Likewise, the frame may be of any configuration deemed desirable.

Figures 2, 3:
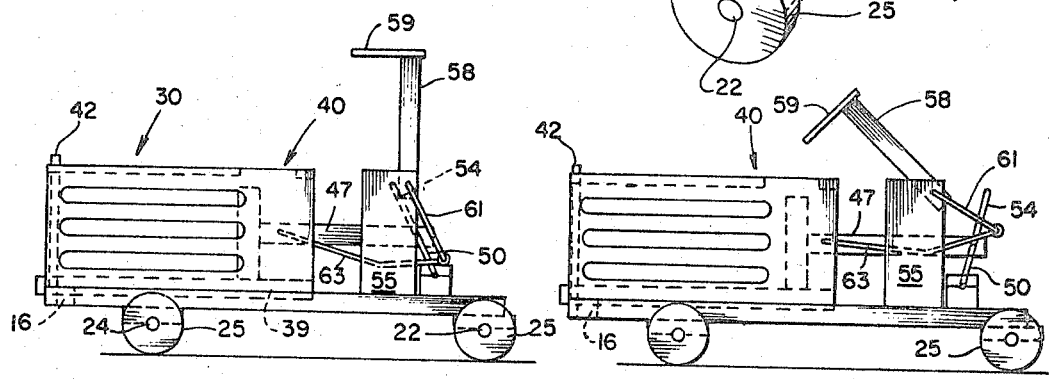
FIGS. 2, 3 and 4 are side elevational views of the toy hay baler of FIG. 1, illustrating operation thereof in the sequence of movement of the feeder and packer of the hay baler according to the invention.
Figure 4:
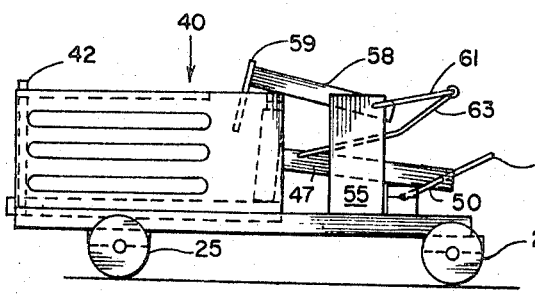

A packing cage, shown in general by numeral 30, includes a pair of rectangular sides 32 and 34 each of which has a series of elongated slots. Side 32 has slots 35, 36 and 37, and corresponding slots are provided in the side 34. A top 38 covers a portion of the top between the sides, and a bottom 39 (shown in FIG. 2) covers the full bottom, forming the cage. The top 38 is less than the length of the sides, leaving an opening 40 at one end thereof. A removable door 42 at the back end provides means for removing bales when completed by the operation of the unit. The end opposite the door 42 is open and a brace member 44 is provided at the top for supporting the sides. A packer head 46, mounted on a packer arm 47, is arranged to move reciprocably into the packing cage through the open end of the cage. The end of the packing arm 47 opposite the head 46 is mounted on a bell crank 50 which is journalled in opposed journal blocks 51 and 52 secured to the frame longerons 10 and 12, respectively. The outer end of one side of the bell crank 50 is formed into a manipulating crank and handle 54. The bell crank 50 is arranged to rotate in the arm 47, so that on rotation of the bell crank the arm reciprocates into and out of the packer cage. A pair of bearing stanchions 55 and 56 are mounted on the frame adjacent the bearing blocks 51 and 52, respectively, and a shaft 57 extends therethrough, being rotatably mounted therein. A feeder arm 58 is rigidly secured to and rotatable with the shaft 57. A feeder head 59 is mounted on arm 58 and it has an extension which is arranged to extend into the feed opening 40 in the packer box. One end of the shaft 57 is bent into a crank arm 61 normal thereto and terminating in a short crank portion 64 generally parallel to the shaft 57. A connecting rod 63 is attached to the end of the arm 47 opposite the bell crank 50 with a pivotal connection. The opposite end of the connecting rod 63 is provided with an eye 62 which is rotatably mounted over the crank end 64, whereby reciprocal movement of the packer alternately moves the feed head into the feed opening 40 as the packer is withdrawn from the packing cage and up for feeding grass into the feed opening.

For use, the removable door 42 is placed in position on the cage, and strings or other suitable means for tying packed grass, is passed through the opposed slots, with sufficient amounts to tie around a bale. The ends of the strings are left dangling from the slots adjacent the door away from the packer. Grass or hay or the like is laid on the top with at least a portion of it extended over the feed opening 40, with the feed rod in the up position of FIG. 2. The crank is then rotated and at the approximate position of FIG. 3, the packed is being retrieved from the packing cage while the feeder is moved toward the down position by means of the connecting rod 63. Further movement of the crank completely withdraws the packer from the packing cage, and the feeder head is moved into the feeder opening 40, bending the grass in reverse bend and stuffing it down into the packing cage. Movement of the crank handle back into the position of FIG. 1 starts withdrawal of the feeder head and starts the packer moving the grass toward the end of the packing cage. This procedure is repeated by moving a sheaf of grass over the opening, turning the handle so that the feeder head doubles the grass and pushes it into the packing cage in a general accordion pleat and the packer packs the bale against the door 42. When the bale has sufficient grass to be completely packed, one end of each string is then drawn through the opposite end of the slots around the grass inside and is tied around the bale so that three strings may be used to tie the packed bale. When the bale is packed and tied, the door 42 is opened and the bale removed from the packing cage.

Figure 5:
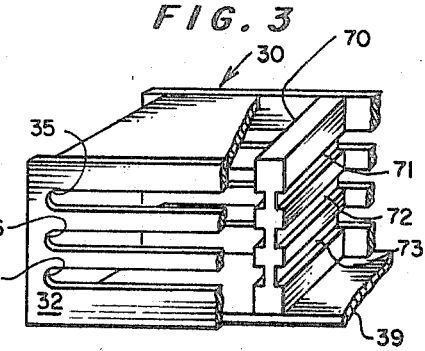
FIG. 5 is a perspective view of a divider plate for use with the invention.

The divider plate, illustrated in FIG. 5, may be used for forming tightly packed bales in place of the door 42. A divider plate 70 is a rectangular member arranged to fit snugly, but movably, in the packing cage 30. The plate includes a series of grooves 71, 72 and 73 on one face and similar grooves on the opposite face. The grooves are aligned with the slots 35, 36 and 37 when the plate is in the cage. A bale wrapping wire or string is placed in each groove with the ends extending out through the grooves, and the plate is pushed toward the packer 46, leaving room to feed grass or hay into the feed opening 40. The doubled-over grass is then pushed against the divider plate which is pushed toward the exit and by the packer as the bale builds up in the cage. As the divider plate approaches the exit end, the wire may be passed around the bale and tied. The divider plate and bale may then be removed, and the divider plate replaced in position in the cage for subsequent operation.

The device may be made of wood or metal or plastic or a combination of them, depending upon the desires of a maker. The feeder arm may be secured to the shaft by pins, splines or the like to hold it rigid with the shaft so that it will pivot on rotation of the shaft. Since the device is a toy, the shafts, connecting rod and bell cranks may be made of lightweight wire, for example 8 or 10 gauge steel wire, and still have it sturdy enough for use as a toy.

While the invention has been illustrated by reference to particular embodiments, there is no intent to limit the spirit or the scope of the invention to the precise details so set forth except as defined in the following claims.

I claim:

1. A toy hay baler comprising frame means; a packing cage mounted on said frame means inclusive of a pair of spaced-apart upright sides, a top and bottom, there being a plurality of elongated slots in said pair of sides in general alignment for holding tying members for baled hay, said packing cage having one open end, and removable means at the other end for retention and removal of baled hay therefrom; a feed opening in the top of said cage adjacent the open end of said packing cage; feeder means pivotally mounted on said frame means for pivotally moving from an upright position into a lowered position for moving cut grass into said cage through said feed opening; said feeder means including an arm fixedly mounted adjacent one end on a lateral shaft, said shaft being mounted on said frame means, and the other end of said arm having a head including a depending portion which extends through said feed opening when said feeder means is in said lowered position; a packer mounted on said frame means extending into said open end of said frame means and reciprocably movable from a retracted position adjacent said open end of said cage to a packing position extended internally of said cage; said packer includes an arm pivotally mounted adjacent one end on a bell crank which induces said reciprocable motion to said packer on rotation of said crank; manually operable crank means for reciprocably moving said packer; and means interconnecting said feeder means and said packer for alternately moving said feeder means into said lowered position when said packer is retracted and into said upright position when said packer is extended into said packing cage on rotation of said crank means.

2. A toy hay baler according to claim 1 wherein said lateral shaft includes a crank arm extension on one end, and said means connecting said feeder means and said packer is a connecting rod secured to said extension whereby reciprocable movement of said packer pivots said feeder means.

3. A toy hay baler according to claim 1 wherein said manually operable crank means extends from an end of said bell crank for operating said packer and said feeder means.

References Cited

UNITED STATES PATENTS

| | | | |
|---|---|---|---|
| 431,471 | 7/1890 | Kinnard | 100—142 |
| 653,789 | 7/1900 | Bragg | 100—180 |
| 726,284 | 4/1903 | Hamilton | 100—142 |
| 728,760 | 5/1903 | Reese et al. | 100—142 |
| 822,411 | 6/1906 | Wehrenberg. | |
| 2,775,930 | 1/1957 | Anderson et al. | 100—180 |

DANIEL BLUM, Primary Examiner

U.S. Cl. X.R.

46—40; 100—100, 180